United States Patent [19]

Hunter

[11] Patent Number: 5,377,268
[45] Date of Patent: Dec. 27, 1994

[54] METERING SYSTEM WITH REMOTELY RESETTABLE TIME LOCKOUT

[75] Inventor: Kevin D. Hunter, Stratford, Conn.

[73] Assignee: Pitney Bowes Inc., Stamford, Conn.

[21] Appl. No.: 117,460

[22] Filed: Sep. 7, 1993

Related U.S. Application Data

[62] Division of Ser. No. 670,804, Mar. 18, 1991, Pat. No. 5,243,654.

[51] Int. Cl.$^5$ .............................................. H04K 1/00
[52] U.S. Cl. ........................................ 380/23; 380/25
[58] Field of Search ................................... 380/23, 25

[56] References Cited

U.S. PATENT DOCUMENTS

| | | | |
|---|---|---|---|
| 3,306,318 | 2/1967 | Wang | 137/552.5 |
| 3,792,446 | 12/1974 | McFiggins et al. | 340/172.5 |
| 3,978,457 | 8/1976 | Check et al. | 340/172.5 |
| 4,097,923 | 6/1978 | Eckert et al. | 364/900 |
| 4,376,299 | 3/1983 | Rivest | 364/900 |
| 4,549,281 | 10/1985 | Eckert et al. | 364/900 |
| 4,634,807 | 1/1987 | Chorley et al. | 178/22.08 |
| 4,757,537 | 7/1988 | Edelmann et al. | 380/51 |
| 4,787,045 | 11/1988 | Storace et al. | 364/464.02 |
| 4,811,234 | 3/1989 | Storace | 364/464.02 |
| 4,812,994 | 3/1989 | Taylor et al. | 364/464.02 |
| 4,827,508 | 5/1989 | Shear | 380/4 |
| 4,831,555 | 5/1989 | Sansone et al. | 364/519 |
| 4,833,618 | 5/1989 | Verma et al. | 364/483 |
| 4,835,697 | 5/1989 | Jones | 364/464.02 |
| 4,864,506 | 9/1989 | Storace | 364/464.02 |
| 4,878,245 | 10/1989 | Bradley et al. | 380/10 |
| 4,888,803 | 12/1989 | Pastor | 380/51 |
| 4,934,846 | 6/1990 | Gilham | 400/104 |
| 5,181,245 | 1/1993 | Jones | 380/23 |
| 5,243,654 | 9/1993 | Hunter | 380/23 |

FOREIGN PATENT DOCUMENTS 2251210A  1/1992  United Kingdom ......... G07B 17/00

Primary Examiner—David C. Cain
Attorney, Agent, or Firm—Charles G. Parks, Jr.; Melvin J. Scholnick

[57] ABSTRACT

A metering system requires a user to provide periodic, accurate meter readings to a billing authority.

The metering system includes a mechanism for dispensing postage or another accountable quantity, an accounting mechanism for updating and storing information regarding the amount of postage dispensed by the dispensing mechanism and an output mechanism for outputting the storing postage information. The system also includes a mechanism for storing a time deadline, a clock that provides a current date signal and a lock that disables the dispensing mechanism when the current date is not before the stored deadline. The system also includes a reset mechanism for extending the stored deadline.

A user of the system reads the output of the system to obtain a current meter reading. The user then telephones the billing authority's data center, provides the current reading to the data center and receives back from the center an encrypted combination that reflects the reading provided by the user. The user enters the combination into the system. The meter decrypts the combination and verifies that the reading provided by the user matches the stored postage information. The meter then extends the stored deadline.

10 Claims, 9 Drawing Sheets

METERING SYSTEM WITH REMOTELY RESETTABLE TIME LOCKOUT

This is a division of Ser. No. 07/670,804, filed Mar. 18, 1991, now U.S. Pat. No. 5,243,654.

FIELD OF THE INVENTION

This invention relates to metering devices and more particularly to metering devices from which a reading is taken to generate a bill for usage or receipt of a metered quantity.

BACKGROUND OF THE INVENTION

Various types of metering devices are known. One example is the electronic postage meter as, for instance, described in U.S. Pat. No. 3,978,457 to Check et al. As is well known, postage meters include an ascending register, that stores a running total of all postage dispensed by the meter, and a descending register, that holds the remaining amount of postage credited to the meter and that is reduced by the amount dispensed each time postage is printed by the meter. Because U.S. Postal Service regulations require that postage be paid in advance, it had traditionally been required that the user of a postage meter periodically present the meter to a Postal Service employee for recharging. At the time of recharging, the user paid to the Postal Service the amount of postage to be credited to the meter and the postal employee credited or recharged the meter by increasing the setting of the descending register by the amount paid. As the meter was used to dispense postage (by printing meter stamps on envelopes or labels), the setting of the descending register was reduced until either the meter was again recharged, or the setting reached zero or a pre-established figure near zero, at which point the meter was automatically locked, and thereby prevented from printing further meter stamps, until the meter was recharged. This locking feature is sometimes referred to as a "credit lockout", signifying that the meter is disabled upon exhaustion of the previously credited amount.

An improved and more convenient method of recharging postage meters while still satisfying Postal Service regulatory requirements has been developed and is described, for example, in U.S. Pat. No. 3,792,446 to McFiggins, et al., entitled "Remote Postage Meter Resetting Method". As described in the McFiggins, et al. patent, a postage meter includes a combination lock that inhibits recharging of the meter. The required combination randomly changes each time the lock is opened. The user of the postage meter maintains an account with a credit balance. A central data center maintains a record of the user's account. When the user wishes to recharge the meter, he places a telephone call to the data center. The data center, using a voice answer back system, obtains identifying information from the user, verifies the information and checks to see that the user has sufficient funds in his account to cover the postage to be credited to the meter. The data center then provides a combination to the user that will allow the meter to be credited with a pre-determined amount of postage. At the same time, the center debits that amount from the user's account. The user enters into the postage meter the combination received from the data center. The meter is then unlocked so that the user can increment the descending register by the predetermined amount.

The remote recharging method described by McFiggins et al. was implemented with great success. A subsequent adaptation and improvement of this method is described in U.S. Pat. No. 4,097,923 to Eckert et al. The system of Eckert et al. is operable with a micro-computer controlled postage meter and allows the user to select a variable amount of postage with which the meter is to be credited. In the Eckert et al. system the user advises the data center of the selected amount of postage and the data center provides a combination that reflects the selected amount of postage. The user enters the selected amount and the combination into the meter, which makes its own calculation of a combination based upon the entered amount. The calculated combination is compared to the entered combination and if the two are consistent, the descending register is incremented by the entered amount.

In contrast to the U.S. Postal Service, the postal authorities of some foreign countries do not require prepayment of postage in all cases. In those countries, postage meters are not required to have the credit lockout feature. Postage meters of the type previously described herein may be adapted for use in those countries by, for example, eliminating the mechanism that locks the meter when the descending register reaches its minimum reading, or by omitting the descending register entirely, or by setting the descending register to a very high reading, or by allowing the user to reset the descending register whenever necessary. However, since postage is not prepaid, arrangements must be made for payment after the fact. Typically these arrangements include presentation of the meter for reading by a postal employee with payment in response to billing based on the meter reading. There is considerable inconvenience in carrying the meter to a post office for reading, or in dispatching a postal employee to the user's office.

Inconvenience in meter reading is not confined to postage meters used in post-payment countries. For example, conventional utility meters, such as gas, water or electric meters also are read by a utility company employee. Although some utility companies require their customers to read the meter and to mail in a reporting card with the current reading, accuracy of the customer's reports still must be periodically verified by sending an employee to read the meter. With or without interim reports from customers, the utility incurs the expense of maintaining a force of meter readers.

It has been proposed to obtain meter readings via telecommunications, as for example in: U.S. Pat. No. 4,833,618 to Verma et al., entitled "System for Automatically Reading Utility Meters from a Remote Location"; U.S. Pat. No. 4,878,245 to Bradley et al., entitled "Control and Metering System for Pay Television over a Cable Network." However, the addition of telecommunication receiving and transmitting equipment to the meter would add significantly to the cost of manufacturing a meter. Also, and particularly in the case of utility or postage meters, attachment to the meter of a dedicated but rarely used telephone line would entail substantial additional operating costs.

SUMMARY OF THE INVENTION

According to the invention, a metering system includes:
(a) a dispensing mechanism for dispensing an accountable quantity;
(b) an accounting mechanism connected to the dispensing mechanism for updating and storing information that represents the amount of the quantity dispensed by the dispensing mechanism;

(c) an output mechanism connected to the accounting mechanism for outputting the stored information;

(d) a storage mechanism for storing a time deadline;

(e) a calendar mechanism for providing a signal that represents the current date;

(f) a locking mechanism connected to the dispensing mechanism, the calendar mechanism and the storage mechanism, for disabling the dispensing mechanism when the current date is not earlier than the time deadline; and (g) a deadline reset mechanism connected to the storage mechanism for extending the stored time deadline.

According to another aspect of the invention, the deadline reset mechanism includes an input mechanism for receiving a verification signal and a comparison mechanism for comparing the verification signal with the stored accounting information. The deadline reset mechanism extends the stored time deadline if the verification signal is in accordance with the stored accounting information.

A metering system as just described provides a convenient way to require a customer to provide accurate and timely meter readings.

According to a fourth aspect of the invention, a method of obtaining a meter reading includes the following steps:

(a) receiving meter reading information from a user of a meter that has a stored time deadline;

(b) generating an encrypted verification code that reflects the meter reading information;

(c) verifying the meter reading information by use of the verification code;

(d) providing a deadline-extending combination to the user;

(e) inputting the combination into the meter; and (f) after the combination has been input into the meter, extending the stored time deadline.

A data center of the type previously described may be conveniently adapted to operate with the method just described.

DETAILED DESCRIPTION OF THE PREFERRED EMBODIMENTS

A. Postage Metering System with Time Lockout

Figure 1:
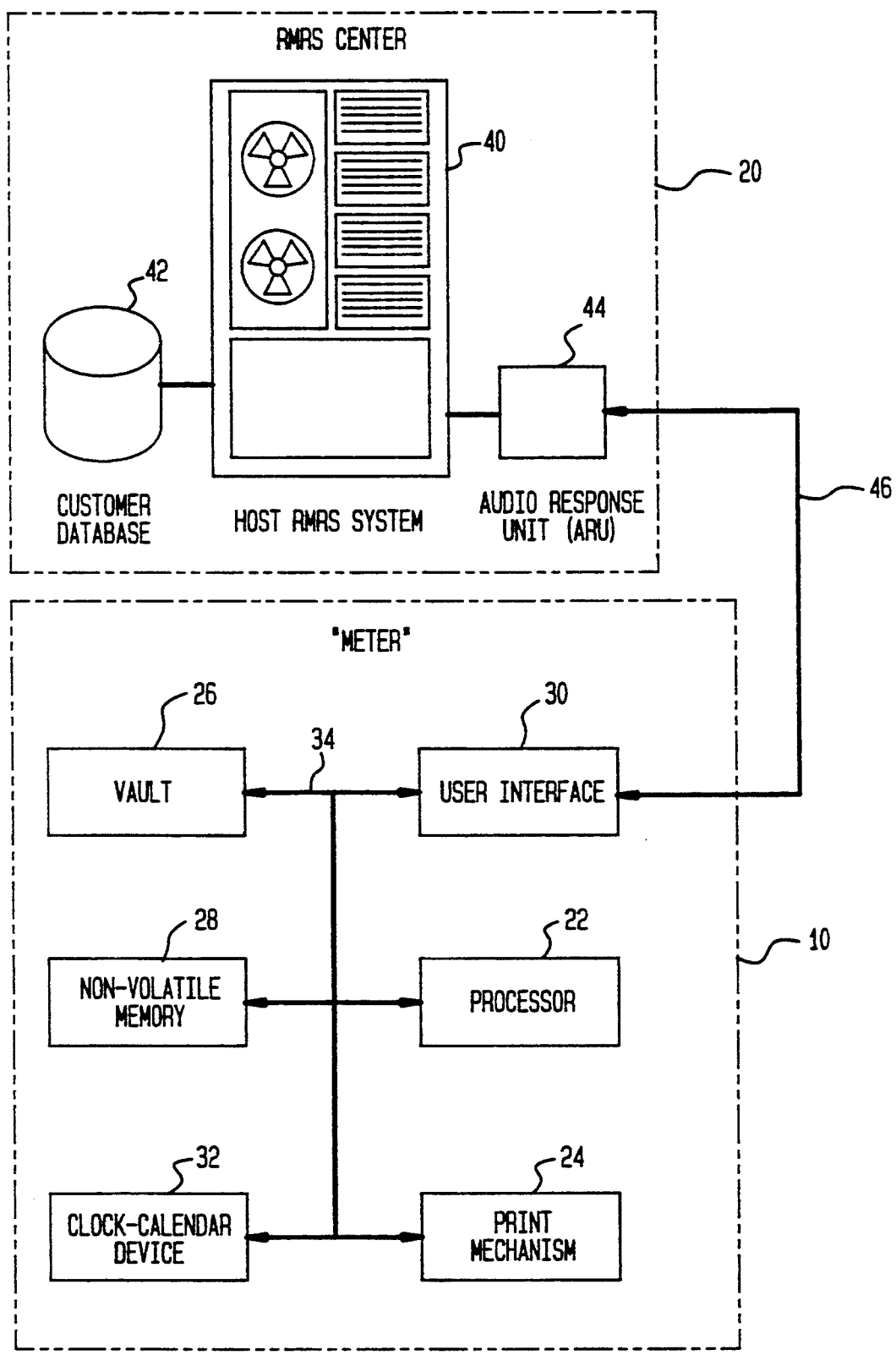
FIG. 1 is a block diagram of a postage metering system and a data center for operation in accordance with the subject invention.

FIG. 1 shows schematically a postage meter 10 and a data center 20 for resetting meter 10. Meter 10 includes processor 22, print mechanism 24, vault 26, nonvolatile memory 28, user interface 30 and clock-calendar device 32. Connecting circuitry 34 interconnects processor 22 with mechanism 24, vault 26, memory 28, interface 30 and device 32. Vault 26 is preferably a physically secure nonvolatile memory that stores postal data such as the ascending and descending registers. Vault 26 may be combined with nonvolatile memory 28. Both nonvolatile memory 28 and clock calendar device 32 are also preferably constructed to be secure from tampering in the same known manner as vault 26. Interface 30 may comprise, for example, a keyboard (not shown) for receiving input from a user and display (not shown) for displaying information to the user. Meter 10 may also include volatile memory, such as RAM (not shown). It will be understood that processor 22 may include or be associated with a permanent program memory such as a ROM for holding a program that controls processor 22.

Meter 10 may be realized by modifying a conventional electronic postage meter (such as the model 6500 marketed by Pitney Bowes Inc., Stamford, Conn., or such as the meter of above referenced U.S. Pat. No. 3,978,457) to include a calendar clock chip such as the model ICM7170 from Intersil Inc., Cupertino, Calif., the model MM58274 from National Semiconductor Corporation, Santa Clara, Calif., or the model MC146818 from Motorola Semiconductor Products, Inc., Phoenix, Ariz.

Data center 20 includes a host computer 40 connected to a memory 42 containing a customer database. Audio response unit (ARU) 44 is also connected to computer 40. In its physical realization, data center 20 may for example resemble the data center described in the above referenced U.S. Pat. Nos. 3,792,446 or 4,097,923.

Connecting line 46 represents exchange of data between data center 20 and meter 10. The data exchange occurs via the user, who reads data from user interface 30 of meter 10, places a telephone call to data center 20, conveys meter data to data center 20, receives resetting data from ARU 44, and inputs the resetting data into meter 10 through interface 30.

Figure 2:
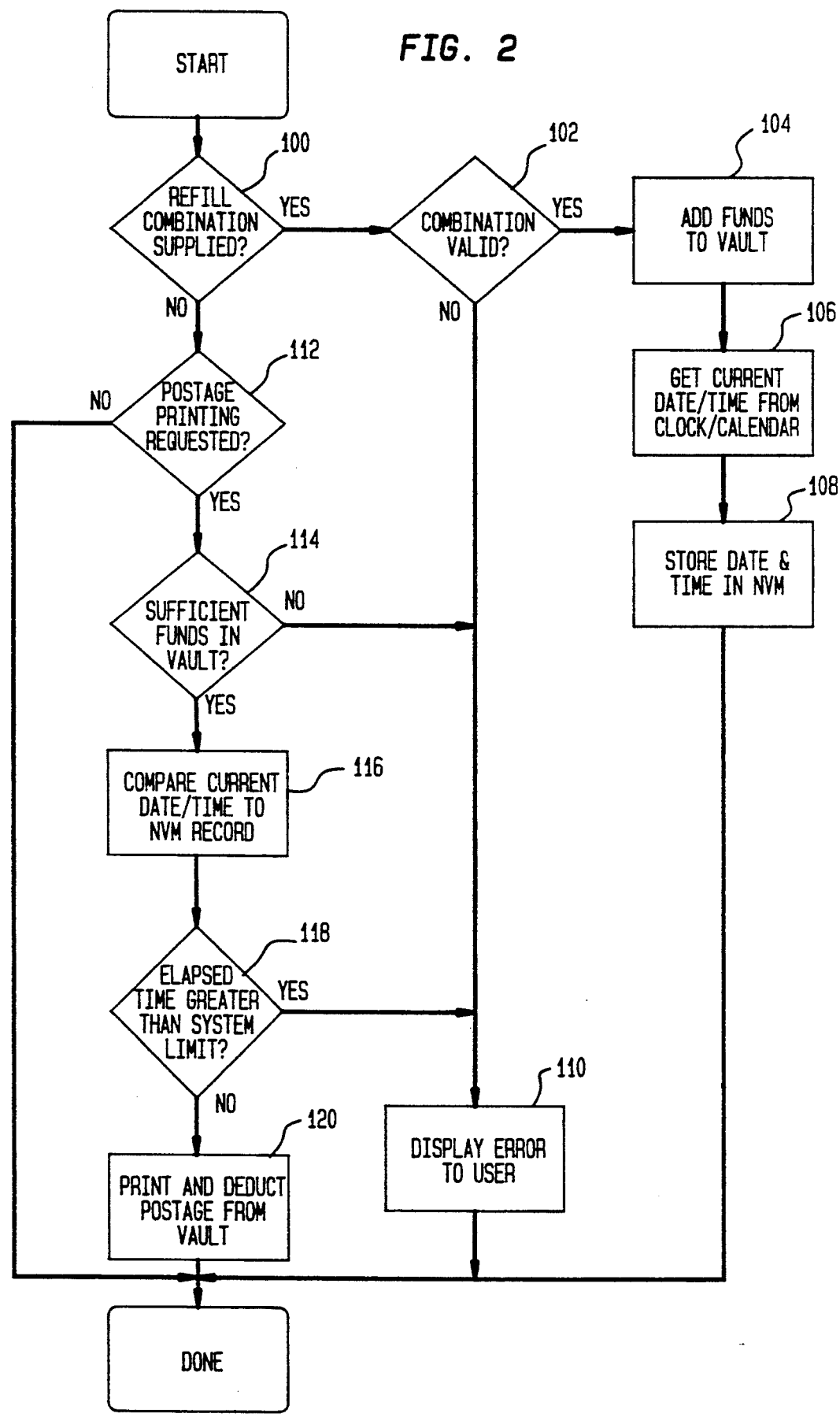
FIG. 2 is a flow chart of a program that controls the metering system of FIG. 1.

FIG. 2 illustrates a software routine that controls the operation of meter 10. The routine commences with a determination as to whether a resetting combination has been input into the meter (step 100). If so, step 102 follows, at which it is determined whether the entered combination is valid. The determination of the validity of the combination may, for example, be as described in above referenced U.S. Pat. No. 4,097,923. If the combination was found to be valid, step 104 follows, at which the descending register is incremented. Then at step 106 processor 22 receives from clock calendar device 32 a signal that represents the current date and time. Processor 22 then stores the date and time in nonvolatile memory 28 (step 108). The routine then ends.

If at step 102 the combination was found not to be valid, an error message was displayed through user interface 30 (step 110) and the routine then ends.

If at step 100 a resetting combination was not input, step 112 follows, at which it is determined whether postage printing is requested. If not, the routine ends. If postage printing is requested, it is next determined, at step 114, whether there are sufficient funds in the vault, i.e. whether the descending register has a reading sufficiently high to permit printing of the requested postage amount (step 114). If there are not sufficient funds, an error message is displayed (step 110) and the routine ends. If there are sufficient funds, step 116 follows at which processor 22 obtains a current date and time signal from the clock calendar device 32 and compares that to the last date and time stored in nonvolatile memory 28. Then at step 110, it is determined whether the current date and time exceed the stored date and time by more than a predetermined time limit, which may be, for instance, 30 or 90 days. If the elapsed time does exceed the limit, an error message is displayed (step 110) and the routine ends without printing of postage. Thus, it can be seen that the last stored date and time together with the predetermined time limit constitute a time deadline which results in a timed lockout of the meter once the current time reaches that deadline.

Returning to step 110, if the time limit is not exceeded, step 120 follows, at which the meter prints postage through print mechanism 24 and then updates vault 26 by adding the amount of postage dispensed to the ascending register and subtracting that amount from the descending register. The routine then ends.

Figure 3:
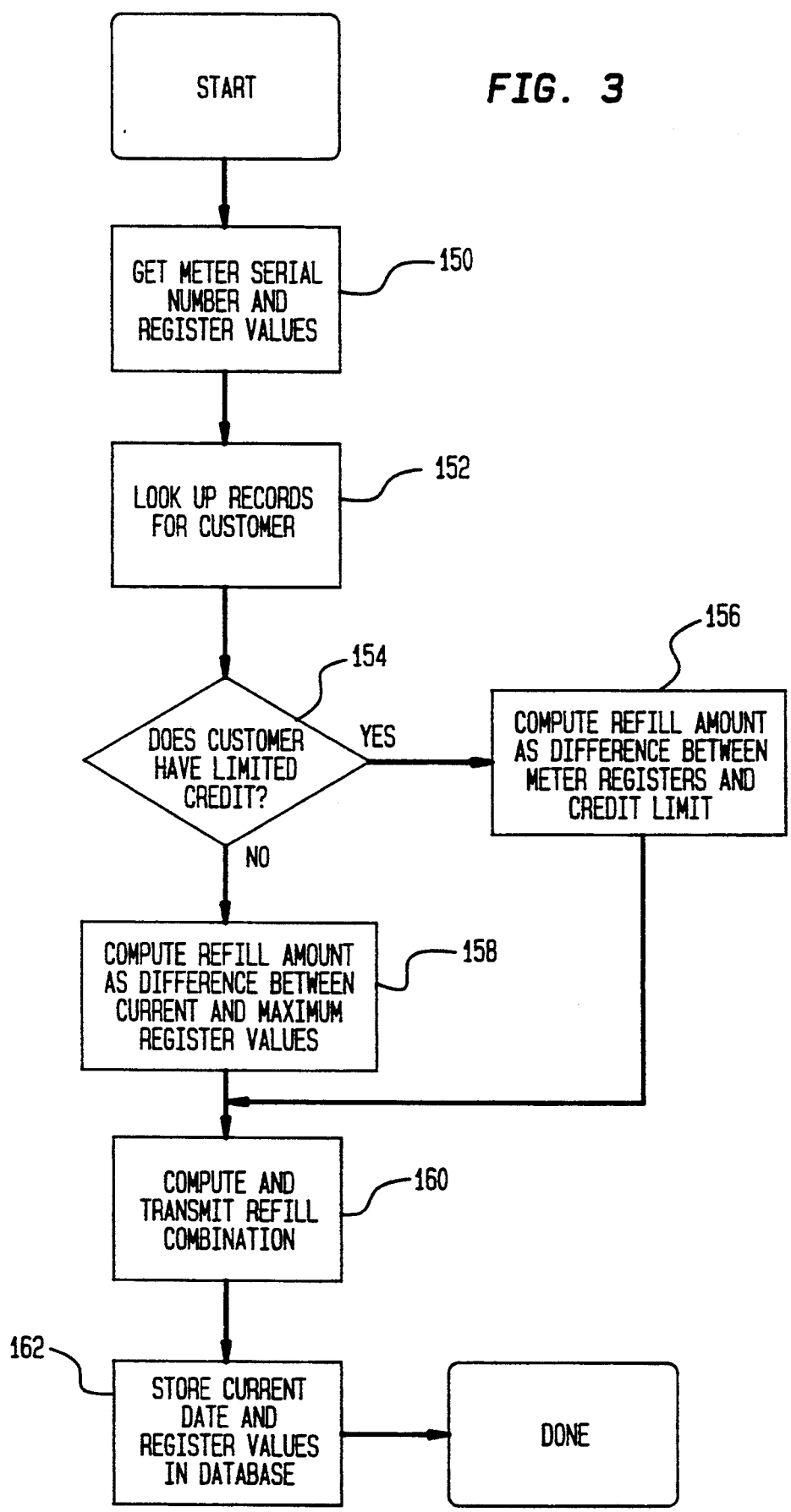
FIG. 3 is a flow chart of a program that operates the data center of FIG. 1.

FIG. 3 illustrates a software routine by which the data center 20 receives a meter reading from a meter user and provides a resetting combination.

The routine begins with receipt of a telephone call from a meter user. At step 150, data center 20, through ARU 44, prompts the suer to enter information identifying the meter that is to be reset and to provide the readings for at least one of the ascending and descending registers. Then at step 152 data center 20 looks up in customer data base 42 the records appertaining to the customer holding the identified meter. As discussed in the above referenced U.S. Pat. Nos. 3,792,446 and 4,097,923, data center 20 may also verify that the entered information was correct.

It is then determined, at step 154, whether the customer holding the meter is subject to a credit limit. If so, step 156 follows, at which a refill amount is computed that reflects the amount of the credit limit and the meter readings supplied by the user. If not, step 158 follows, in which a resetting amount is computed which maximizes the setting on the descending register.

Following step 156 or 158, as the case may be, is step 160 at which data center 20 computes and transmits to the user a resetting combination. The combination will reflect, in encrypted form, both the authorized resetting amount and at least one of the register values input to the data center 20 by the user. When the user then inputs the combination provided by data center 20 into meter 10, initiating the routine of FIG. 2, meter 10 will use the combination at step 102 to verify that valid register values had been input by the user at step 150.

Returning now to FIG. 3, step 162 follows step 160. At step 162 data center 20 stores the current date and register values received from the user in customer data base 42. Data center 20 now has all information required to generate a current account billing to the customer for postage dispensed by meter 10.

It will be recognized that the postage metering system just described includes a credit lockout as well as a time lockout. However, it is within the contemplation of this invention that the credit lockout be omitted. In such an embodiment, vault 26 may be omitted or may comprise only an ascending register. If vault 26 is omitted, then the ascending register is maintained in NVM 28. In either case, the ascending register may be reset to zero each time a valid combination is received. In operation, step 114 (FIG. 2) is omitted, as there is no vault 26 and no credit lockout. Similarly, step 104 is omitted or is replaced by a step in which the ascending register is reset to zero.

In serving a meter of this embodiment, the data center's operation may omit steps 154, 156, 158 (FIG. 3). Alternatively, if it is desired to establish credit limits for meter users, or to disable meters of users who fail to make required payments, steps 154, 156, 158 may be replaced by a subroutine in which the data center determines whether the user's credit limit has been exceeded or the user is past due in his payments, in which case no combination is transmitted to the user.

It will also be recognized that there are a number of alternative ways in which the time deadline may be stored. For example, in the embodiment previously described nonvolatile memory 28 stores the latest time at which a valid combination is received, and thereafter compares elapsed time from the stored time against a predetermined time limit. As an alternative, nonvolatile memory 28 may store a future time as a time deadline, which may for instance be 30 or 90 days later than date on which a valid combination was last received. The meter then compares a current time and date signal, as provided by the clock/calendar, with the stored deadline and locks or simply does not actuate the printing mechanism if the current date is not before the deadline.

The metering system advantageously also includes a routine for testing whether the time deadline will soon be reached and displaying a warning of this fact. Additional steps to accomplish these functions may readily be inserted, for example between steps 118 and 120 of FIG. 2.

In still another alternative embodiment of a postage metering system according to the invention, meter 10, upon an appropriate command entered by the user, calculates and displays an encrypted verification code. The verification code reflects the current reading of either or both of the ascending and descending registers and may also reflect the current date as provided by clock-calendar device 32 and/or the meter's serial number. The user then provides the verification code and the current register reading or readings to data center 20, which then uses the verification code to verify the accuracy of the register reading as provided by the user. Data center 20 then provides to the user a combination that, when input into meter 10, will cause meter 10's time deadline to be extended. It will be appreciated that the verification code and register readings may be transmitted to data center 20 by mail instead of by telephone and that the combination may also be provided to the user by mail.

B. Utility Metering System with Time Lockout

Figure 4:
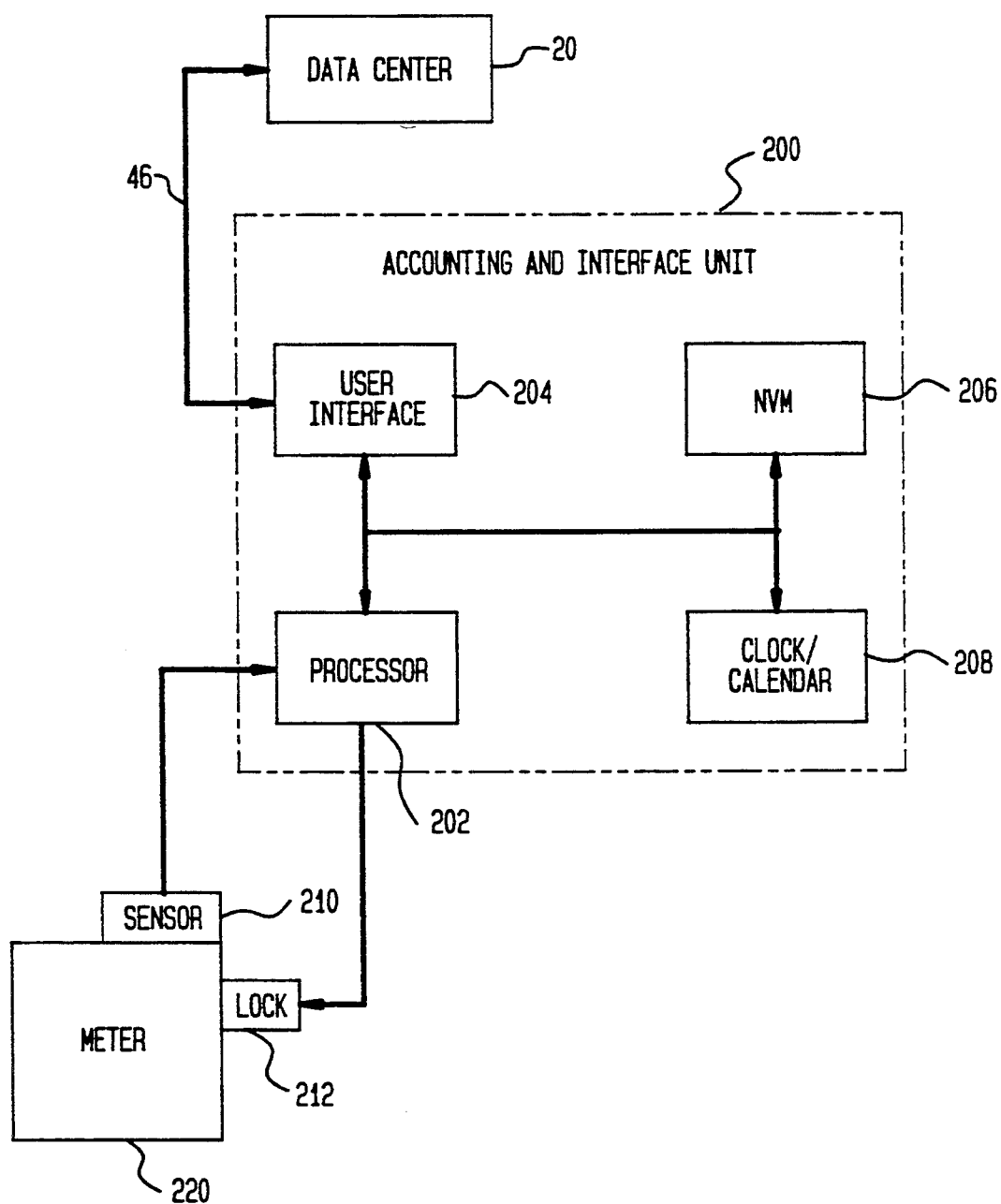
FIG. 4 is a block diagram of a utility meter system in accordance with the subject invention.

Referring now to FIG. 4, a utility metering system with time lockout is schematically shown. Accounting and interface unit 200 includes processor 202, as well as user interface 204, nonvolatile memory 206 and clock/calendar device 208, all of which are connected to processor 202. As before, user interface 204 preferably includes a display and a keyboard and processor 202 may include or be associated with a program memory.

Processor 202 is connected to receive data from a sensor 210 and is also connected to actuate or deactuate a locking device 212. Both sensor 210 and locking device 212 are physically associated with meter 220, which may be a conventional gas, electric or water meter. Sensor 210 is connected to meter 220 in such a way as to sense the current reading of meter 220. Sensor 210 provides to processor 202 data representing the current reading. Locking device 212 may for instance, if meter 220 is an electric meter, include a switch that selectively allows electricity to pass or not to pass through meter 220. In case meter 220 is a gas or water meter, locking device 212 may include a mechanism that opens or closes a valve that controls the flow of gas or water through meter 220.

Although sensor 210 and locking device 212 are shown in FIG. 4 as add-on items associated with meter 220, it will be appreciated that either or both of sensor 210 and locking device 212 may be physically integrated into meter 220. For example, if meter 220 is of a type in which the current reading is stored as digital data, sensor 210 may simply comprise connections required for processor 202 to access an addressable data storage location in which the reading is stored. As another example, locking device 212 may take the form of an electronic or electron-mechanical switch within meter 220. It will further be recognized that some or all of accounting and interface unit 200 may be physically integrated with meter 220.

Data center 20 as shown in FIG. 4 may be physically identical to the data center 20 used with the postage metering system of FIG. 1. Data exchange between data center 20 and accounting and interface unit 200 again is represented by a connecting line 46 and may be of the same sort as described in connection with the postage metering system of FIG. 1.

Figure 5A:
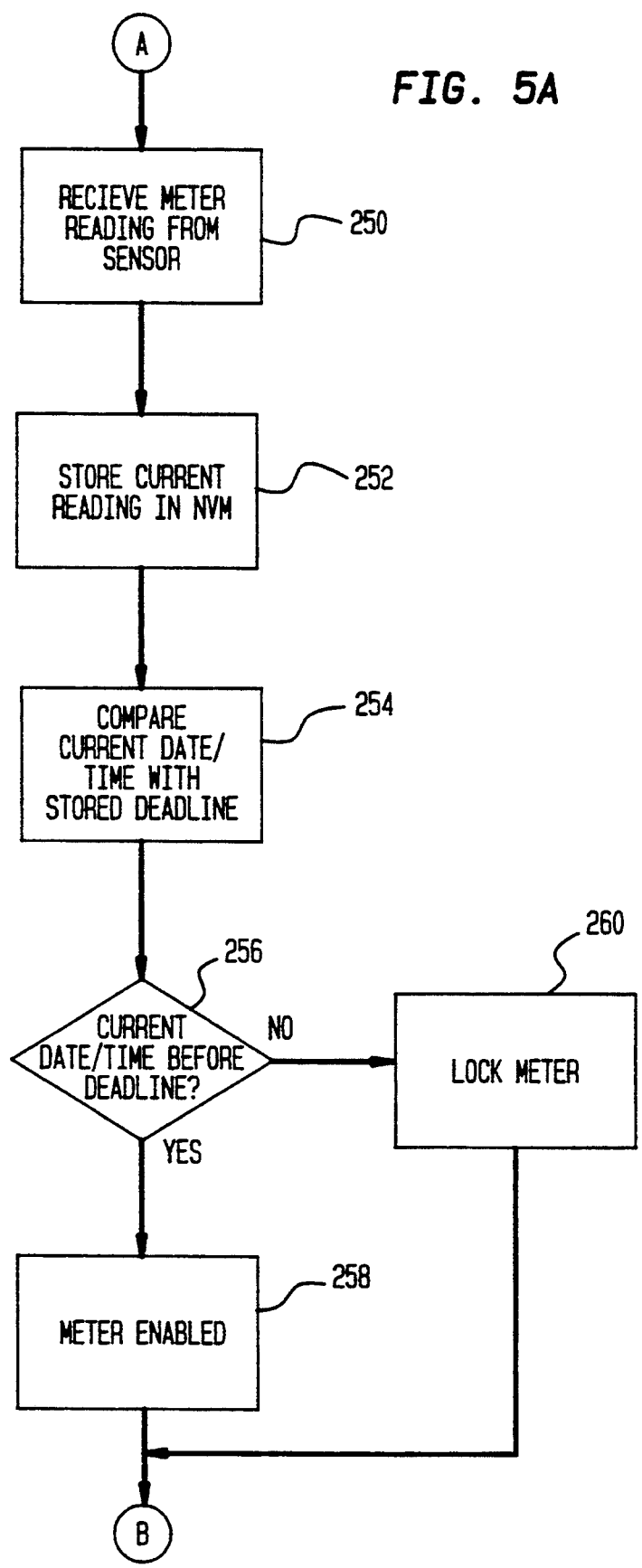
FIGS. 5A, 5B are a flow chart of a program that controls the meter system of FIG. 4.
Figure 5B:
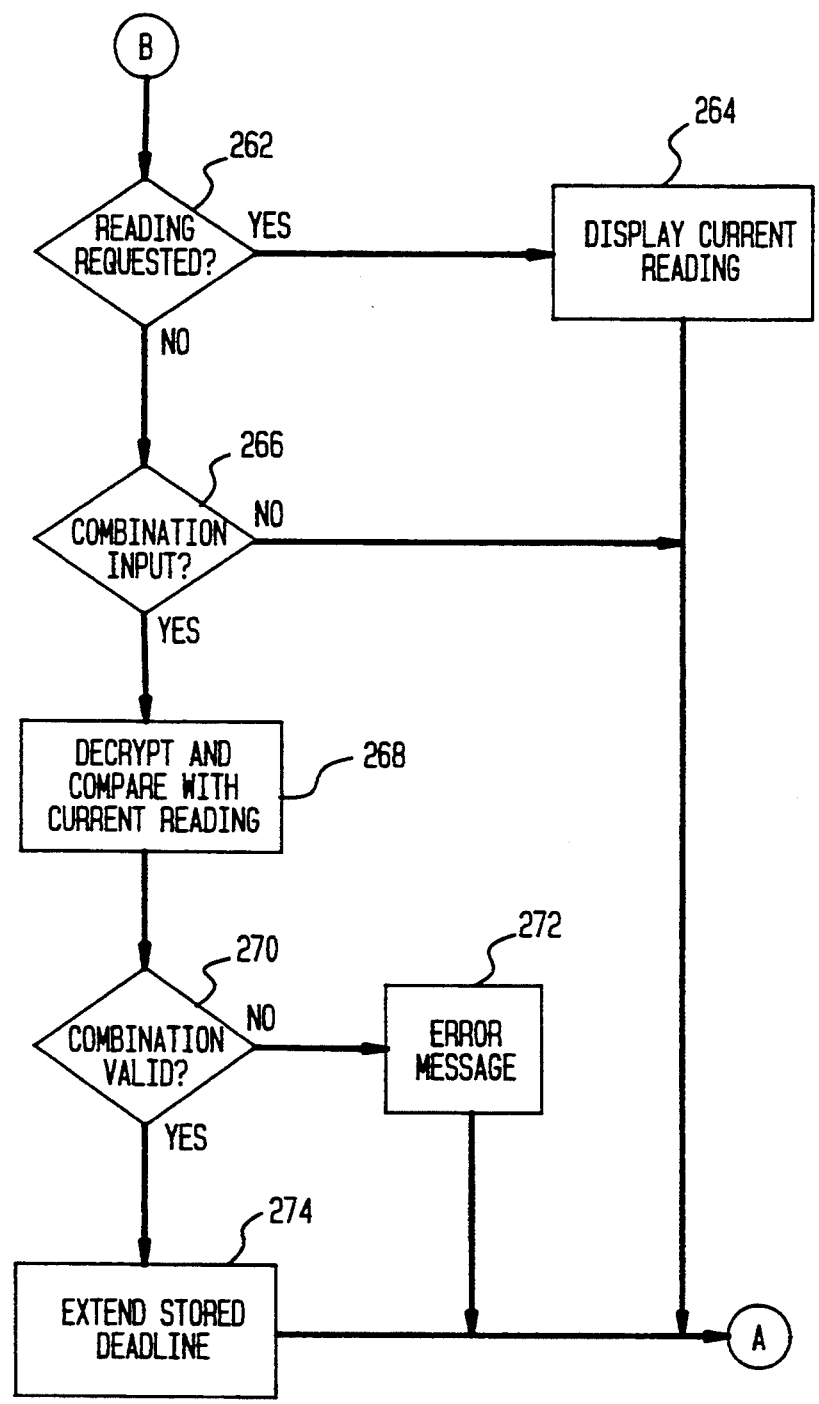

FIGS. 5A, 5B are a flow chart that illustrates a program for operating accounting and interface unit 200. Although illustrated as a continuously repeating loop, the program of FIGS. 5A, 5B could also readily be implemented as a routine that is repeatedly called at frequent intervals by a monitor or other main program.

The program begins with step 250, at which processor 202 receives from sensor 210 data representing the current reading of meter 220. Next, at step 252, processor 202 stores in nonvolatile memory 206 the data received from sensor 210.

The program then proceeds to step 254, at which processor 202 compares the current date and time, as provided by clock calendar device 208, with a deadline that has previously been stored in nonvolatile memory 206. The program branches at step 256, depending on whether the current date and time is before the stored deadline. If the current date and time is before the deadline, meter 220 is either unlocked, or is allowed to remain unlocked, as the case may be (step 258). However, if the current date and time is not before the stored deadline, step 256 is followed by step 260, at which processor 202 causes locking device 212 to lock meter 220 and thus prevent meter 220 from dispensing the metered quantity.

Following either step 258 or step 260 is step 262, at which it is determined whether the user has, through user interface 204, requested a current meter reading. If so, accounting and interface unit 200 displays the current reading of meter 220 through user interface 204 (step 264). Preferably, the current reading is displayed via user interface 204 for a predetermined period of time, such as ten seconds, and the program then returns to the beginning of the loop.

If the current meter reading has not been requested, it is next determined, at step 266, whether the user has input a combination through user interface 204. If not, the program returns to the beginning of the loop. If a combination has been input, the program proceeds to step 268, at which the combination is decrypted and the meter reading information derived from the decrypted combination is compared with the current meter reading as most recently stored in nonvolatile memory 206.

At this point it should be noted that unlike a postage meter, the current reading of a utility meter may be constantly changing as, for instance, a continually flowing supply of electricity or natural gas passes through the meter to the user's facilities. Since there is likely to be some elapsed time between the user's requesting of a current reading (step 262) and his input of a combination received from data center 20 during a telephone call to the data center, it will be appreciated that the current reading reflected by the input combination will probably differ by some small amount from the most recently stored current reading. Accordingly, it is preferable that the combination decrypted at step 268 be considered valid if the current reading reflected by the decrypted combination does not differ from the latest stored current reading by more than a predetermined amount. It will be appreciated that the predetermined amount will be sufficiently large to allow a reasonable amount of time for the user to obtain a reading from the accounting and interface unit 200, call data center 20, receive a combination from data center 20, and input the combination into unit 200 through user interface 204.

Returning to FIG. 5B, the program branches at step 270 depending on whether the decrypted combination is found to be valid. If not, an error message is displayed (step 272) and the program returns to the beginning of the loop. If the combination was found to be valid, step 270 is followed by step 274, at which processor 202 causes the stored deadline to be extended. As discussed in connection with the postage metering system of FIG. 1, there are a number of ways in which the deadline may be stored and extended. For instance, upon receipt of a valid combination, the stored deadline may be automatically changed to a date that is a predetermined number of days, such as 30 or 90 days, after the current date as provided by clock/calendar device 208.

As with the postage metering system, accounting and interface unit 200 advantageously displays a warning when the time deadline is soon to be reached.

Figure 6:
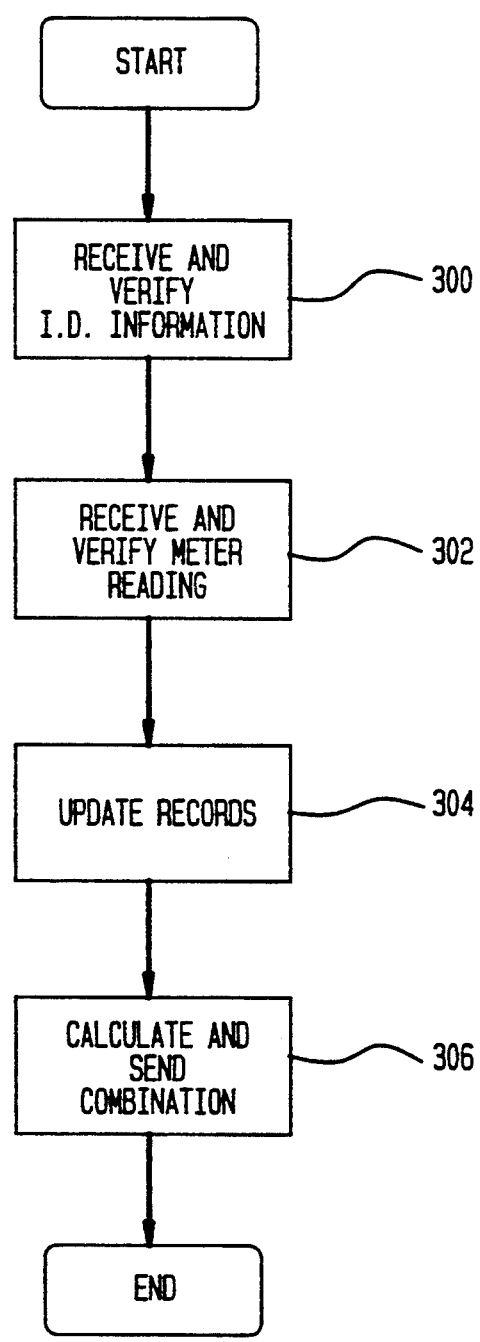
FIG. 6 is a flow chart of a program that operates a data center for use with the meter system of FIG. 4.

FIG. 6 is a flowchart that illustrates a routine for operating data center 20 with the utility metering system of FIG. 4. The routine is initiated by receipt of a telephone call from a user. At step 300, data center 20 receives and verifies identifying information, which may, for instance, include the user's account number and/or a meter serial number. Then, at step 302, data center 20 receives the current meter reading from the user and verifies that the reading is at least approximately accurate. For example, the meter reading as received from the user may be compare to the most recent prior reading, to confirm that the reading just received is higher than the prior reading. Next, at step 304, data center 20 updates its records to reflect the current meter reading information provided by the user. Then at step 306 data center 20 calculates an encrypted combination that reflects the meter reading supplied by the user and transmits the combination to the user.

It will be appreciated that data center 20 now contains all data necessary for an up to date billing of the customer. It will also be understood that the customer is now free to input the combination which, assuming that it is valid, will allow the stored deadline in the accounting and interface unit 200 to be extended. Finally, as will be apparent to those skilled in the art, steps 300 and 302 as briefly described above will include appropriate steps for dealing with receipt by the user of unverifiable identifying information or unverifiable meter reading information.

In an alternative approach to carrying out this invention, there is no lock 212 associated with meter 220. Instead, accounting and interface unit 200 includes a capability for generating an encrypted verification code that reflects the current reading of meter 220. Generation of the code can be initiated by the holder of meter 220. The code is displayed via user interface 204. The code may reflect the current date as provided by clock/calendar device 208 and/or a serial number of meter 220 or interface unit 200.

The user transmits to data center 20 both the current reading and the verification code. Data center 20 then uses the verification code to verify the reading. Thereafter data center 20 issues a billing user reflecting the verified reading.

In the event that the user fails to transmit a valid meter reading either before a preestablished deadline or within a given time after receiving a notice, the utility company may disconnect the utility service.

As mentioned before, interface unit 200 may be physically integrated into, or physically separate from, meter 220. Unit 220 preferably comprises a conventional electronic display such as a plurality of seven-segment LCD digital displays. The verification code and the current reading may both be displayed (perhaps at succeeding times) on this display, or as one alternative, the code alone may be displayed by the display, with the meter reading being displayed on a separate display device such as the conventional analog dials.

Transmission of the reading and code may be by telephone connection to data center 20, which may be equipped with a "voice answer back" audible response unit, as previously discussed. Alternatively, the reading and the code may be transmitted by a postcard, e.g.

C. Software Metering System with Time Lockout

Although licenses to use software are usually subject either to a one-time payment in advance or to fixed periodic payments, it has been suggested that licensors of software may wish to charge users on a variable basis, depending on how much use is made of the software. In short, the usage of the software would be metered, and the license fee would be paid periodically in an amount that reflected the metered usage of the software. The metering could take a number of forms, such as keeping track of the length of time that the software was running, or of the number of times that a key subroutine was called, or in suitable types of software, of the number of transactions handled. Of course, combinations of these factors could be used.

It is also known to prevent unauthorized copying or use of a particular software package by providing a software protection device, or "dongle", which must be connected to a computer in order to run the software on the computer. Such a device is described, for instance, in U.S. Pat. No. 4,634,807 issued to Chorley et al.

Figure 7:
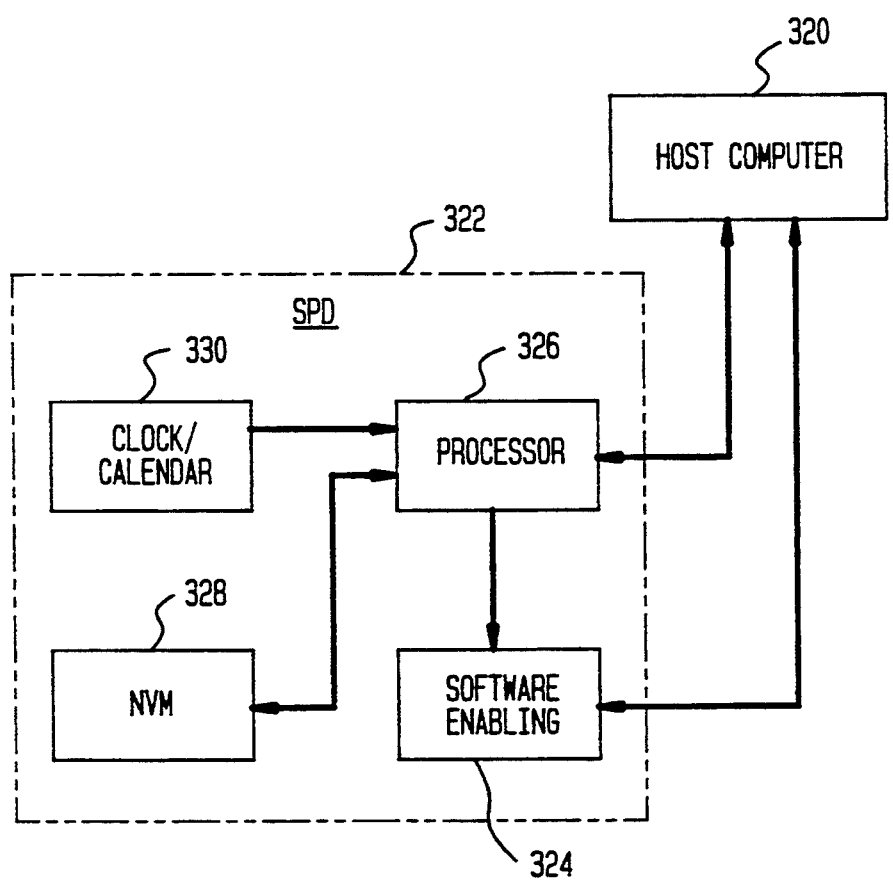
FIG. 7 is a block diagram of a software protection device that includes a timed lock-out metering capability in accordance with the subject invention.

FIG. 7 shows in schematic form a software metering system that includes a software protection device with time lockout capability. Computer 320 is the computer in which the software to be metered is installed. Computer 320 may be, for example, a conventional personal computer with a display and a keyboard, or may be a mainframe or minicomputer.

Software protection device (SPD) 322 is connected by conventional means to computer 320. SPD 322 includes software enabling device 324, which may be a ROM that holds a key subroutine that is called by the metered program running in 320. SPD also includes processor 326, nonvolatile memory (NVM) 328 and clock/calendar device 330. Processor 326 is connected to NVM 328 and is capable of reading data from, and writing data into, NVM 328. Processor 326 is also connected to clock/calendar device 330 so as to receive signals representing the current date and time. Finally, processor 326 is connected to software enabling device 324 so as to be capable of selectively sending a signal that disenables software enabling device 324 and so prevents the metered program from running on computer 320.

Alternatively, software enabling device 324 may be of the type, described in the above-mentioned U.S. Pat. No. 4,634,807, which includes a processor, a clock/calendar device and nonvolatile memory. In this case, processor 326, NVM 328 and clock/calendar device 330 may be integrated into software enabling device 324 and SPD 322 may be identical in terms of componentry to the software protection device described in U.S. Pat. No. 4,634,807.

Figure 8:
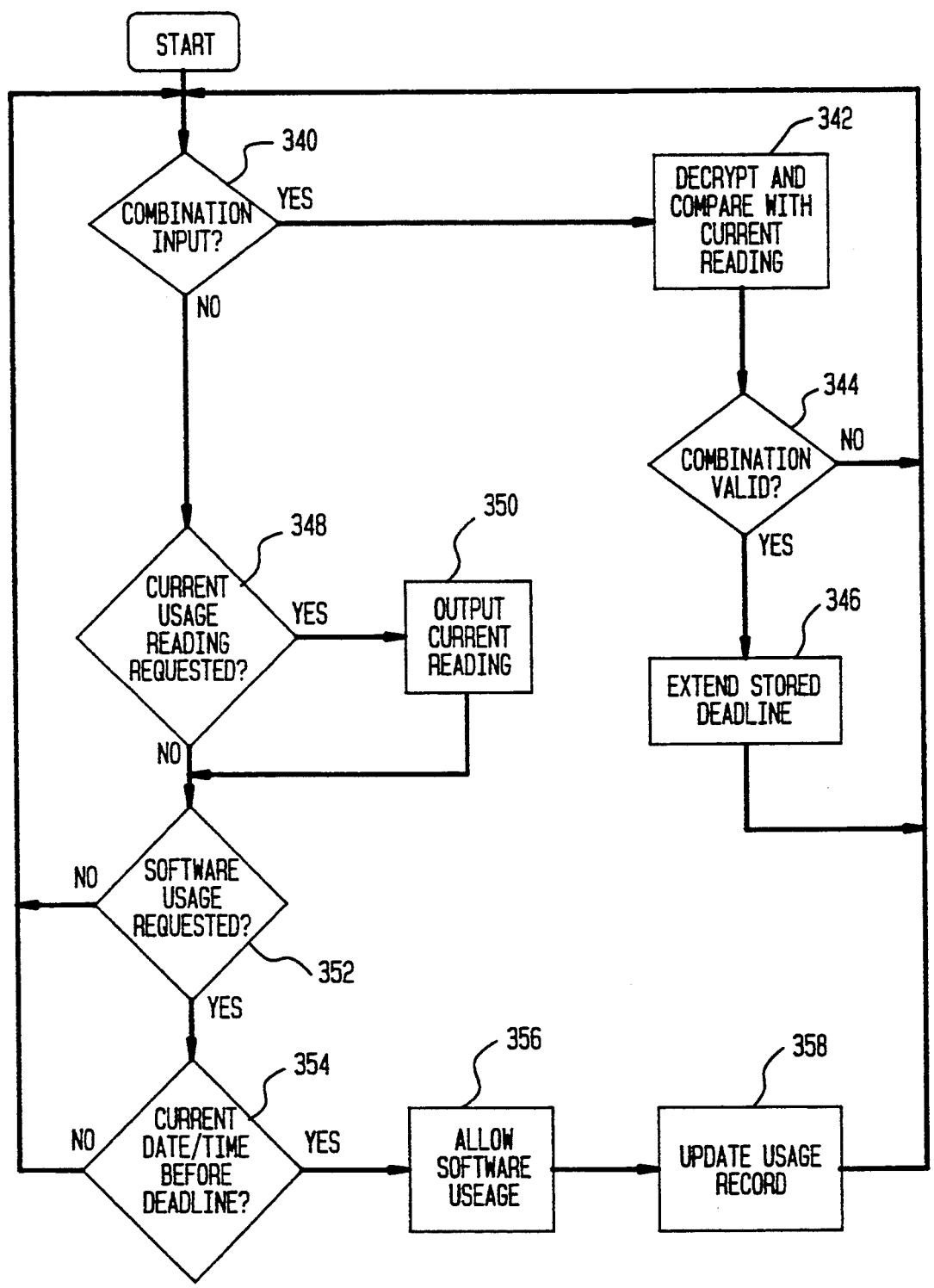
FIG. 8 is a flowchart of a program that controls the software protection device of FIG. 7.

FIG. 8 is a flowchart that illustrates a program for controlling SPD 322.

The program begins with step 340, at which it is determined whether a combination has been input through the keyboard of computer 320. If so, step 342 follows, at which processor 326 decrypts the input combination and compares the usage reading derived from that combination with the usage reading most recently stored in MVM 328. The program then branches at step 344. If the combination was not found to be valid the program loops back to the beginning, preferably displaying an error message such as "combination invalid". If the combination was valid, the program proceeds to step 346 at which processor 326 causes a time deadline stored in nonvolatile memory 328 to be extended. For instance, the deadline may automatically be set to a date that is 30 days after the current date and time, as provided by clock/calendar device 330. There is then preferably displayed a message such as "deadline extended to Nov. 30, 1991" and the program then loops back.

If at step 340 it is determined that a combination was not input, then step 348 follows, at which it is determined whether the user has requested a current usage reading by, for example inputting the appropriate command through the keyboard of computer 320. If so, step 350 follows, at which processor 326 retrieves a current usage reading from NVM 328 and that current reading is then displayed by computer 320.

If it is found at step 348 that a usage reading was not requested, or after step 350, as the case may be, the program proceeds to step 352, at which it is determined whether the user has requested computer 320 to run the metered software. If not, the program loops back. If the user has requested to run the metered software, the program proceeds to step 354, at which processor 326 receives from clock/calendar device 330 a signal representing the current date and time. Processor 326 compares the current date and time with a time deadline that has been stored in MVM 328. If the current date and time is not before the deadline, processor 326 does not allow the metered software to run in computer 320 and the program loops back. Preferably an appropriate error message is displayed.

If at step 354 the current date and time was found to be before the deadline, step 356 follows, at which processor 326 allows the metered software to run in computer 320. As the metered software runs, SPD 322 keeps track of the usage on the basis, e.g., of running time, transactions performed, number of accesses to a given subroutine, or otherwise. A current usage reading is continuously stored and updated in NVM 328 (step 358). The program illustrated on FIG. 8 loops back when the running of the metered software ceases, and, if the metered software is of a sort that may be run continuously for long periods, the program of FIG. 8 preferably also loops back at regular intervals, such as daily, so that it may be determined whether the stored time deadline has been reached. It is also advantageous for the program to cause computer 320 to display a warning when the time deadline is soon to be reached.

A data center like that described in connection with FIGS. 4 and 6 may also be used in connection with the software metering system of FIGS. 7, 8. As before, the user requests a current usage reading from the metering system, calls the data center, inputs the reading information, and receives a combination from the data center. The combination is encrypted and reflects the reading information provided by the user. The user then inputs the combination into the metering system through computer 320. This causes the metering system's stored deadline to be updated, as just described.

In an alternative embodiment of a time lockout software metering system, no software protection device is used. Instead, the software to be metered is installable only on a computer that includes a clock/calendar device and a permanent memory such as a hard disk or battery-backed-up RAM.

A subroutine like the program of FIG. 8 is incorporated in the metered software. The subroutine causes a time deadline and a current usage reading to be stored in the permanent memory. The subroutine also queries the clock/calendar device for a current date signal. The subroutine runs repeatedly and disables the main program when the current date is not before the deadline.

This embodiment is not preferred because of the relative ease with which the subroutine could be circumvented.

D. Other Applications of Time Lockout Metering Systems

Up to this point, there have been described systems for metering postage, software usage, or utilities such as natural gas, water or electrical power. However, it is within the contemplation of this invention to include metering of any accountable quantity capable of being dispensed by any means. For example, as is known to those skilled in the art, postage meters may also be used as tax revenue stamping machines or as parcel registers. In these cases the meter's printing mechanism is considered to be dispensing tax revenues or parcel carriage charges rather than postage. The time-lockout postage metering system described above may be utilized in the tax meter and parcel register applications just mentioned.

As another example, the integrated time lockout utility meter described above could be integrated into a system for dispensing pay-television programming like the system of the above-mentioned U.S. Pat. No. 4,878,245.

Although in each of the embodiments described above the data exchange between the data center and the metering system takes place via the user, it is also within the contemplation of this invention that data be exchanged between a data center and a metering system without human intervention. In one such case both the data center and the metering system are equipped with modems and either the metering system dials up to the data center, the center dials up the metering system, or communications are by a dedicated line and are initiated by the center or the meter system. While direct data exchange is not preferred because of the expense thereof, the time lockout provided by this invention may still prove advantageous by, for example, inhibiting the user from interfering with the communication link between the meter and the data center.

The disclosure of above-mentioned U.S. Pat. Nos. 3,978,457; 3,792,446; and 4,097,923 is hereby incorporated herein by reference.

It should be recognized that the above described embodiments have been provided by way of illustration only and that other embodiments of the subject invention will be apparent to those skilled in the art from consideration of the above description and the attached drawings. Accordingly, limitations on the subject invention are to be found only in the claims set forth below.

What is claimed is:

1. A method of obtaining a meter reading for a metering system that has a display and means for generating encrypted code numbers, said method comprising the steps of:
   (a) displaying on said display a current meter reading information;
   (b) generating and displaying an encrypted verification code, said code reflecting said meter reading information;
   (c) transmitting said meter reading information and said verification code to a data center; and
   (d) verification said meter reading by use of said verification code.

2. The method of claim 1, further comprising the step of answering an incoming telephone call from a user of said metering system to establish a two-way communication channel between said user and said data center.

3. The method of claim 2, further comprising the step of providing audible information to said user by means of an audio response unit and via said communication channel.

4. A method of obtaining a meter reading, comprising the steps of:
   (a) receiving meter reading information from a user of a meter, said meter having a stored time deadline;
   (b) generating an encrypted verification code, said code reflecting said meter reading information;
   (c) verifying said meter reading information by use by said verification code;
   (d) providing a deadline-extending combination to said user;
   (e) inputting said combination into said meter; and
   (f) extending said stored time deadline after said inputting of said combination.

5. The method of claim 4, wherein:
   said meter reading information is received by a data center;

said verification code is generated by said data center and reflects said received meter reading information;

said combination is said verification code; and said meter verifies said meter reading information by use of said combination.

6. The method of claim 5, further comprising the step of answering an incoming telephone call from said user to establish a two-way communication channel between said user and said data center;

said data center receiving said meter reading information via said communication channel;

said data center providing said combination to said user via said communication channel.

7. The method of claim 6, wherein aid combination providing step comprises providing audible information to said user by means of an audio response unit.

8. The method of claim 4, wherein:

said verification code is generated by said meter;

said meter reading information and said verification code are received by a data center;

said data center verifies said meter reading information by use of said verification code; and said data center provides said combination after verifying said meter reading information.

9. The method of claim 8, further comprising the step of answering an incoming telephone call from said user to establish a two-way communication channel between said user and said data center;

said data center receiving said meter reading information and said verification code via said communication channel;

said data center providing said combination to said user via said communication channel.

10. The method of claim 9, wherein said combination providing step comprises providing audible information to said user by means of an audio response unit.

* * * * *